United States Patent [19]

Gollmick et al.

[11] 4,090,307

[45] May 23, 1978

[54] METHOD FOR REMOVING WATER FROM WORKPIECES AND APPARATUS THEREFOR

[75] Inventors: Hans-Joachim Gollmick, Kelkheim; Karl Klinkhart, Erzhausen; Herbert Morzinek, Nauheim; Wolfgang Bereiter, Babenhausen; Walter Rosenstock, Frankfurt am Main, all of Germany

[73] Assignees: Schoeller & Co.; Elektrotechnische Fabrik GmbH & Co., Frankfurt am Main, Germany

[21] Appl. No.: 734,436

[22] Filed: Oct. 21, 1976

[30] Foreign Application Priority Data

Oct. 25, 1975 Germany .............................. 2547891
Sep. 25, 1976 Germany .............................. 2643330

[51] Int. Cl.² ............................................. F26B 3/00
[52] U.S. Cl. ............................................. 34/9; 34/73; 34/75
[58] Field of Search ............................ 34/9, 69, 73, 75

[56] References Cited

U.S. PATENT DOCUMENTS

| | | | |
|---|---|---|---|
| 3,386,181 | 6/1968 | Steinacker | 34/9 |
| 3,710,450 | 1/1973 | Figiel | 34/9 |
| 3,886,668 | 6/1975 | Remond et al. | 34/9 |

Primary Examiner—John J. Camby
Attorney, Agent, or Firm—Toren, McGeady and Stanger

[57] ABSTRACT

A method for removing water from the surface of workpieces, particularly, glass workpieces, by dipping the workpieces into a boiling dewatering bath composed of an organic solvent which is immiscible with water and which contains surface active agents, and subsequently rinsing the workpiece in one or more baths of the pure organic solvent in order to remove the surface active agent. The subsequent rinsing baths may be boiling or at ambient temperature and vapors therefrom as well as from the initial dewatering bath are condensed and collected.

An apparatus for carrying out the method is also disclosed.

9 Claims, 2 Drawing Figures

METHOD FOR REMOVING WATER FROM WORKPIECES AND APPARATUS THEREFOR

BACKGROUND OF THE INVENTION

1. Field of the Invention

This invention pertains to the field of the removal of water from the surface of various workpieces, particularly, glass workpieces. More particularly, the invention relates to the utilization of solvent drying of workpieces.

2. Description of the Prior Art

A method for the continuous removal of water from a workpiece by means of solvents which do not form an azeotropic mixture that contains large amounts of water or boils considerably below the boiling point of the pure solvent has been disclosed in DOS. No. 17 29 442. In this process, a bath which is in vigorous motion is used which contains, as its main constituent, an organic solvent which is immiscible with water. It has a boiling point of about 20° to 60° C and a density at 20° C of at least about 1.1. The solvent does not form an azeotropic mixture with water which contains more than about 4% by weight water and which boils more than 8° C below the boiling point of the pure solvent.

In addition to a turbulent zone wherein any existing water on the workpiece which is dipped therein is split into droplets, a steady zone is maintained in the bath wherein the existing water forms a water layer.

Anhydrous solvent is introduced into the turbulent zone continuously at a given rate and the water layer is removed continuously from the steady zone.

The water is displaced from the surface of the non-absorbent workpiece by dipping the latter into the turbulent zone of the bath. By subsequent rinsing of the workpieces in the pure organic solvent, the surface active agents which enhance the displacement of the water from the surface of the workpiece, and are added to the dewatering baths for this purpose, are also removed.

It has been found that this method does not yield completely satisfactory results with respect to the drying of optical glasses since spots or dots will remain on the glass surface. The formation of these dots is caused by small traces of water remaining during the drying. These have an adverse effect on the optical properties of the glass and also interfere with the heat treatment of the glass.

SUMMARY OF THE INVENTION

We have now discovered a method for removing water from workpieces and particularly, from optical glasses utilizing a solvent which is immiscible with water which completely avoids the formation of the spots or dots encountered with the prior art processes. It is thus an object of the present invention to improve the known method in order to eliminate the traces of water on optical glasses which will lead to the formation of dots. This has been accomplished by separately condensing the solvent vapors from the dewatering baths and from the subsequent rinsing baths and returning the condensate from the dewatering bath to either the dewatering bath or other rinsing baths utilizing either a water separator or a drying unit in the case of condensate returned to the rinsing baths.

Due to the separate condensation of the solvent vapors above the dewatering bath and the rinsing baths, the water traces contained in the vapors above the dewatering bath do not get into the vapor above the rinsing baths so that the deposit of dot-shaped water droplets on the glass surface in the vapor space of the rinsing baths or tanks is avoided.

Particularly, the present invention provides for the removal of water from the surface of a workpiece wherein the workpiece is dipped into a dewatering bath composed of an organic solvent which is immiscible with water and a surface active agent, the bath being at the boiling temperature, such that a water layer is formed. Thereafter, the workpiece is rinsed in a second bath composed of the pure organic solvent in order to remove the surface active agent which adheres to the surface of the workpiece. The workpiece is then allowed to dry as by sitting in air and the vapors which are formed from the dewatering bath are condensed, water is removed from the condensed vapors and then the water-free condensate is returned to the dewatering bath.

The water layer is removed from the dewatering bath and any remaining solvent is removed from the water layer thus obtained and said remaining solvent is then returned to the dewatering bath.

DESCRIPTION OF THE PREFERRED EMBODIMENT

Figure 1:
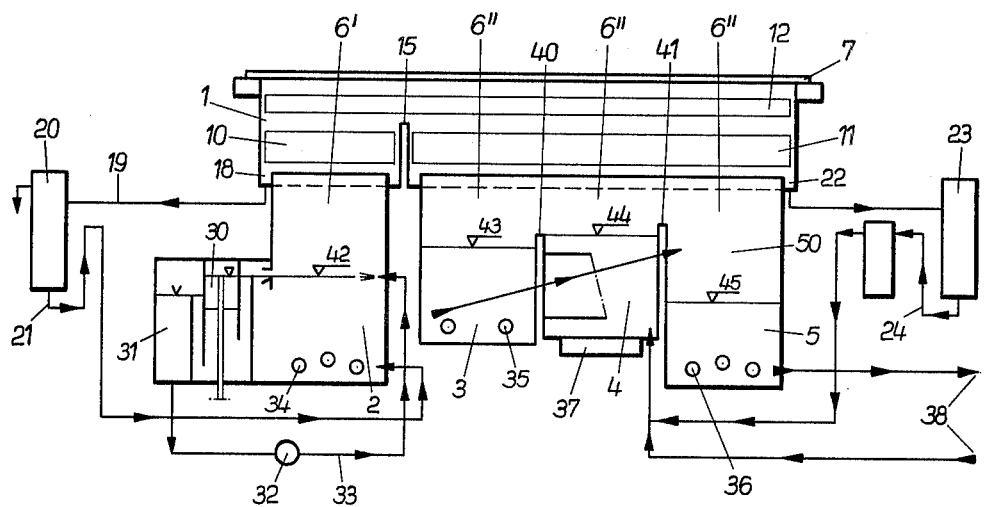
FIG. 1 is a diagram of a drying apparatus in accordance with the present invention.

Referring to the drawings, and particularly FIG. 1, a drying apparatus for carrying out the method of the present invention is shown. Particularly, the chamber superstructure 1 is shown in which is installed dewatering tank or bath 2 and three rinsing tanks, 3, 4, and 5. Above tank or bath 2 is a vapor space 6, and above tanks 3, 4, and 5, are vapor spaces 6″. The chamber superstructure is closed as the top by casing cover 7.

Cooling coils 10, 11, and 12 are arranged on the walls of the cooling zone above the vapor space above baths 2, 3, 4 and 5. These cooling coils are designated 10, 11, and 12 of which cooling coils 10 and 11 are at essentially the same level as one another and are separated from each other by partition 15.

Under cooling coil 10, a condensate trough 18 is present which is connected through pipe 19 to water separator 20. The anhydrous solvent can be fed through pipe 21 to dewatering tank 2.

Cooling coil 11 is arranged above the three rinsing tanks and has a condensate trough 22 which is connected to drying unit 23 which then withdraws water from the condensate. The anhydrous solvent is fed through a pipe 24 to rinsing tank 4.

A water separator 30 and storage tank 31 are connected to dewatering tank 2 in a conventional manner. Water separator 30 separates the water which was introduced into the tank when the wet workpiece was dipped into the tank. Solvent is fed back to storage tank 31.

Pump 32 is connected to storage tank 31 and this pump circulates the solvent through pipe 33 into dewatering tank 2. In tanks 2, 3 and 4, electrical heaters or other heating means 34, 35, and 36 for heating the solvent to the boiling temperature are present while tank 4 is desirably equipped with ultrasonic vibrators 37 and an appropriate cooling system.

A continuously working distillation system 38 can be connected in parallel to the regenerating circuit of tanks 3, 4 and 5. Between the first and second rinsing tanks, 3 and 4, an overflow weir 40 is arranged and between the second and third rinsing tanks, 4 and 5, is arranged a partition 41. The height of the liquid level in the individual tanks or baths is indicated by triangles 42 to 45.

In use, the wet workpiece is first dipped into the boiling solvent of dewatering bath 2 and the adhering water is liberated from the surface of the workpiece. Three rinsing baths, 3, 4 and 5 are provided in order to remove the surface active agents which are contained in the dewatering bath 2. The workpiece is lifted below the cooling coil 12 from tank 2 into tank 3 and dipped into the boiling solvent bath, i.e., which is, in effect, the second bath, the dewatering tank being the first bath. The workpiece is then dipped into bath 4 which is filled with cold solvent and is then subjected to the ultrasonic treatment, if desired. Finally, the workpiece is introduced into vapor space 50 which is above the solvent in tank 5 and subsequently removed from the drying plant dry and free of spots.

It is further noted that from trough 18, condensate from dewatering tank 2 is removed and passes through water separator 20. The anhydrous water-free solvent is then circulated through line 21 back into dewatering tank 2.

Figure 2:
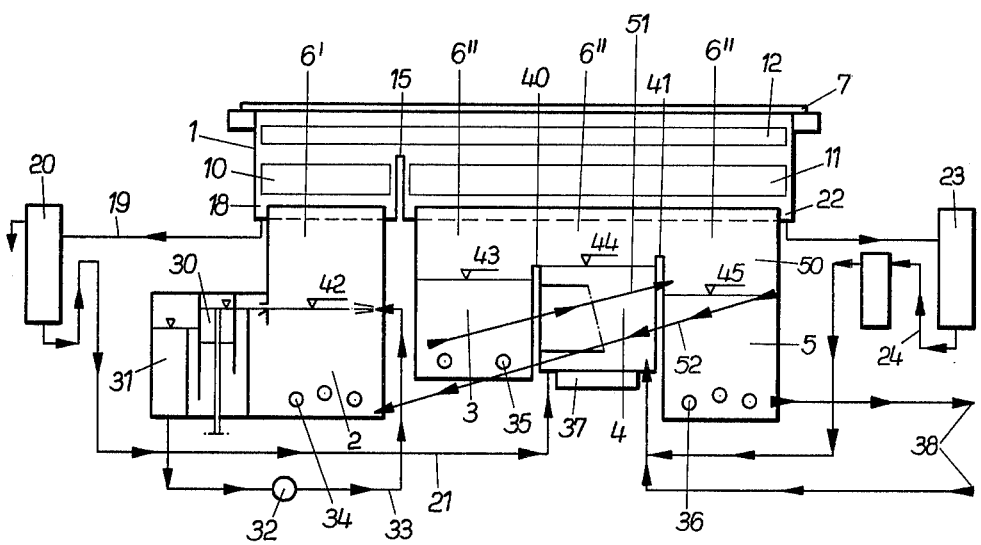
FIG. 2 is a view similar to that of FIG. 1 showing yet another embodiment of the drying apparatus in accordance with the present invention.

Referring now to FIG. 2, the basic difference between the embodiments shown in FIG. 2 and that in FIG. 1, is that water separator 20 also has a drying unit and that line 21 emerging from this combination enters into second rinsing bath 4, rather than back into the dewatering bath.

Additionally, line 51 leads from the first to the third rinsing bath and line 52 from the third rinsing bath 5 back to dewatering tank 2. These lines serve to return surface active agent dropped during the dipping of the workpieces into the bath back into the dewatering bath.

The pure solvent arriving from the water separator and dryer 20 is conducted through line 21 into rinsing bath 4. From there, the solvent passes over weir 40 in rinsing bath 3 and through pipe 51 into rinsing bath 5. From this rinsing bath 5, surface active agent which may be in the tank is fed from the surface at 45 through line 52 to dewatering bath 2. The heights of the surface levels 42 to 45 are different in order to permit the above-described cascade type circuitry of the solvent.

It is thus seen, that when the workpieces are dipped into the individual baths, traces of the surface active agents can be dragged from the dewatering bath into the rinsing baths so that the concentration of the surface active agents decreases when the drying plant is in continuous operation. In order to avoid this, it is another object of the present invention to return any displaced surface active agent to the dewatering bath and to feed the solvent containing traces of surface active agent from the last rinsing bath back to the dewatering bath. It is for this purpose that lines 51 and 52 are utilized as well as the level system of surface levels 43, 44, 45 in tanks 3, 4 and 5, respectively.

In any event, it is clear that from the presently described process and apparatus, water droplets cannot remain on the treated workpieces and consequently, the spotting generally encountered with the prior art processes is avoided.

Having thus described our invention, what is claimed is:

1. A method for removing water from the surface of a glass workpiece comprising the steps of:
   (a) dipping the workpiece into a dewatering bath composed of an organic solvent which is immiscible with water and a surface active agent said bath being at the boiling temperature whereby a water layer is formed in the bath;
   (b) thereafter rinsing the workpiece in a second bath composed of the pure organic solvent to remove the surface active agent adhering to the surface of the workpiece;
   (c) drying the workpiece;
   (d) condensing vapors formed from the dewatering bath, removing water therefrom, and returning the water-free condensate to the dewatering bath;
   (e) removing the water layer from the dewatering bath;
   (f) separating any remaining solvent from the removed water layer and returning said remaining solvent to the dewatering bath and,
   (g) separately condensing vapors for the second bath, removing water from said condensed vapors, and returning the water-free condensate to the second bath.

2. The method of claim 1 wherein the second bath is at boiling temperature, and wherein after dipping the workpiece in the second bath, the workpiece is dipped in a third bath composed of the pure solvent at ambient temperature and wherein the workpiece is then subjected to contact with vapors from a fourth bath of the pure solvent which is at the boiling temperature before the workpiece is dried.

3. The process of claim 2 wherein the third bath is subjected to ultrasonic vibration.

4. A method for removing water from the surface of a workpiece comprising the steps of:
   (a) dipping the workpiece into a dewatering bath composed of an organic solvent which is immiscible with water and a surface active agent said bath being at the boiling temperature whereby a water layer is formed in the bath;
   (b) thereafter rinsing the workpiece in a second bath composed of the pure organic solvent to remove the surface active agent adhering to the surface of the workpiece;
   (c) then dipping the workpiece in a third bath composed of the pure solvent at ambient temperature; and then
   (d) subjecting the workpiece to contact with vapors from a fourth bath of the pure solvent which is at the boiling temperature;
   (e) condensing vapors formed from the dewatering bath, removing any residual water from the vapors and introducing the condensed water-free vapors into the second, third and fourth baths;
   (f) introducing solvent from the fourth bath into the dewatering bath;
   (g) removing the water layer from the dewatering bath; and
   (h) separating any remaining solvent from the removed water layer and returning said remaining solvent to the dewatering tank; and
   (i) drying the workpiece.

5. An apparatus for removing water from the surface of a workpiece comprising:

(a) a dewatering tank having means for heating a solvent contained therein and means for condensing vapors of said solvent;
(b) second, third and fourth rinsing tanks each having means for condensing vapors of solvents contained therein and said second and fourth tank having means for heating a solvent contained therein;
(c) said dewatering tanks further having means for separating solvent from water contained in vapors condensed by the condensing means and returning the separated solvent to the tank and means for separating water from solvent in the tank and returning the water-free solvent to the third tank;
(d) said second, third and fourth tanks having means for collecting vapors condensed from the condensing means thereof, removing water from the condensed vapors and returning the condensed vapors to the third tank.

6. The apparatus of claim 5 wherein second, third and fourth tank have vapor spaces which communicate with one another and wherein each tank possesses a common condensing unit.

7. The apparatus of claim 5 wherein the third tank has means for imparting ultrasonic vibration to the contents thereof.

8. The apparatus of claim 5 wherein the second and third tanks are separated from one another by an overflow weir.

9. An apparatus for removing water from the surface of a workpiece according to the method of claim 5 comprising:
(a) a dewatering tank having means for heating a solvent contained therein and means for condensing vapors of said solvent;
(b) second, third and fourth rinsing tanks each having means for condensing vapors of solvents contained therein and said second and fourth tank having means for heating a solvent contained therein;
(c) said dewatering tank further having means for separating solvent from water contained in vapors condensed by the condensing means and returning the separated solvent to the tank and means for separating water from solvent in the tank and returning the water-free solvent to the third tank;
(d) said second, third and fourth tanks having means for collecting vapors condensed from the condensing means, each tank sharing a common condensing means, means for collecting the condensed vapors from the three tanks, distilling the collected condensed vapors and returning them to the third tank.

* * * * *